(12) United States Patent
Paul et al.

(10) Patent No.: US 6,552,107 B1
(45) Date of Patent: Apr. 22, 2003

(54) MELT OR SOLUTION PROCESSABLE HIGHLY CONDUCTING POLYANILINE AND PROCESS FOR PREPARATION THEREOF, AND BLENDS THEREOF WITH PVC AND EVA

(75) Inventors: Raji Kannaparampil Paul, Kerala (IN); Chennakkattu Krishna Sadasivan Pillai, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/535,512

(22) Filed: Mar. 24, 2000

(51) Int. Cl.⁷ .............................. C08K 5/41; C08K 5/42
(52) U.S. Cl. ................. 524/158; 252/500; 252/518; 252/519; 252/520
(58) Field of Search .................. 524/158; 252/500, 252/518, 519, 520

(56) References Cited

U.S. PATENT DOCUMENTS

| | | | |
|---|---|---|---|
| 2,324,300 A | | 7/1943 | Harvey |
| 3,046,226 A | * | 7/1962 | Sandberg et al. |
| 5,068,463 A | | 11/1991 | Walter |
| 5,160,457 A | * | 11/1992 | Elsenbaumer ............... 252/500 |
| 5,217,649 A | * | 6/1993 | Kulkarni et al. ............ 252/500 |
| 5,290,483 A | * | 3/1994 | Kulkarni et al. ............ 252/500 |
| 5,494,609 A | * | 2/1996 | Kulkarni et al. ............ 252/500 |
| 5,498,372 A | * | 3/1996 | Hedges ....................... 252/511 |
| 5,520,852 A | * | 5/1996 | Ikkola et al. ................ 252/521 |
| 5,595,689 A | * | 1/1997 | Kulkarni et al. ............ 252/500 |
| 5,648,416 A | * | 7/1997 | Miller et al. ................ 524/500 |
| 5,721,056 A | * | 2/1998 | Wessling ..................... 428/461 |
| 5,783,111 A | * | 7/1998 | Ikkola et al. ................ 252/500 |
| 5,866,043 A | * | 2/1999 | Ikkola et al. ................ 252/500 |
| 6,054,514 A | * | 4/2000 | Kulkarni ..................... 524/111 |
| 6,060,116 A | * | 5/2000 | Kulkarni et al. ......... 427/213.3 |
| 6,229,054 B1 | * | 5/2001 | Dai et al. .................... 568/630 |

FOREIGN PATENT DOCUMENTS

| | | | |
|---|---|---|---|
| EP | 0 545 729 A1 | | 6/1993 |
| GB | 828496 | * | 2/1960 |
| GB | 2262525 A | * | 6/1993 |
| WO | WO 90/10297 | | 9/1990 |
| WO | WO 90/13601 | | 11/1990 |
| WO | WO 92/21741 | * | 12/1992 |
| WO | WO 00/34219 | * | 6/2000 |

\* cited by examiner

*Primary Examiner*—Margaret Medley
(74) *Attorney, Agent, or Firm*—Darby & Darby

(57) ABSTRACT

The invention relates to a melt or solution processable polyaniline comprising of polyaniline doped or protonated with a dopant of the formula (1), (2) or (3) shown below.

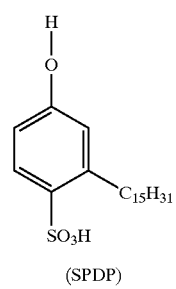

(SPDP)

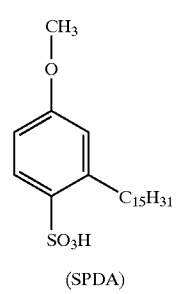

(SPDA)

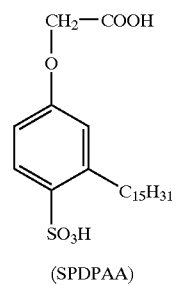

(SPDPAA)

The invention also relates to a process for the preparation of said melt or solution processable polyaniline.

22 Claims, No Drawings

MELT OR SOLUTION PROCESSABLE HIGHLY CONDUCTING POLYANILINE AND PROCESS FOR PREPARATION THEREOF, AND BLENDS THEREOF WITH PVC AND EVA

FIELD OF THE INVENTION

The present invention relates to a melt or solution processable polyaniline and processes for the preparation of said melt or solution processable polyaniline by using novel dopants synthesised from inexpensive, naturally occurring bimonomers from cashew nut shell liquid. The present invention also relates to a novel process for the preparation of dopants for use in the present invention. The novel dopants employed in the process of the present invention are sulphonic acid derivatives of hydrogenated cardanol (3-pentadecyl phenol), methyl ether of 3-pentadecyl phenol (3-pentadecyl anisol) and phenoxy acetic acid of 3-pentadecyl phenol of the formulae 1, 2 and 3 shown below:

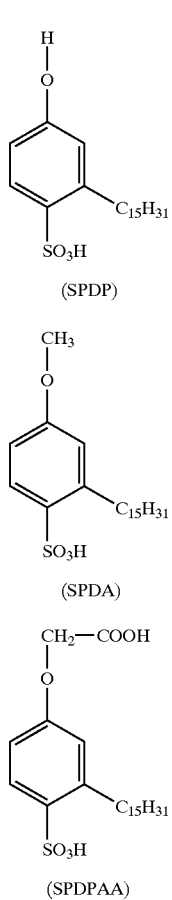

The doping of polyaniline with the dopants described above imparts conductivity to polyaniline and polyaniline doped with these dopants can be used in applications to develop transparent highly conductive films and coatings. Polyaniline which is brittle and unprocessable could be processed by melt or solution techniques by protonating with these functionalized dopants. These conductive polymers show a tremendous promise for industrial applications ranging from electrostatic dissipation to electrochromic displays such as the use in antistatic ESD coatings, absorption of radar frequencies, corrosion prevention, EMI/RFI shielding, electrochemical actuators, lithographic resists, lightning protection, microelectronics, polymer electrolytes, photovoltaics, rechargeable batteries, smart windows, solar cells, bio-sensors etc. One of the significant features of the structure of the dopant prepared by the process of the present invention is that it has a flexible n-alkyl ($C_{15}H_{31}$) substituent in the meta position of the aromatic ring which makes the doped polyaniline melt processable and render high solubility for polyaniline in common solvents. The presence of hydrophobic and hydrophilic moieties in the same molecule imparts the polyaniline dopant combination compatibility with a large spectrum of polymers for probing applications involving polymer blends. This enhanced solubility of doped polyaniline makes it possible for the preparation of highly transparent and conductive films and coatings by solution casting or melt processing techniques and conductive plastics could be prepared by blending the doped polyaniline with classical thermoplastic polymers. Thus, these conductive polymers show vast promise for industrial applications such as in static films for transparent packaging of electronic components, electromagnetic shielding, rechargeable batteries, light emitting diodes, non-linear optical devices, sensors for medicine and pharmaceutics and membranes for separation of gas mixtures. The industries to which this invention can be applied are electronic industries, plastics industries, medical industries etc.

BACKGROUND OF THE INVENTION

Polyaniline is one of the most promising conductive polymers due to its uncomplicated polymerisation and excellent chemical stability combined with relatively high levels of conductivity (J. C. Chiang and A. G. Mac Diarmid, synth. Met., 13, 193 (1986). However, it is highly intractable and infusible because of its aromatic nature, the interchain hydrogen bondings and the charge delocalization effects. Emeraldine base form of polyaniline is soluble only in N-methyl-pyrrolidone, selected amines, concentrated sulfuric acid and other strong acids [M. Angelopoulos, A. Ray, A. G. Mac Diarmid and A. J. Epstein, Synth. Met., 21, 21 (1987); X. Tan, Y. Sun, Y. Wei, Makromol. Chem. Rapid Commun. 9, 829 (1988); M. Angelopoulos, G. E. Asturias, S. P. Ermer, A. Ray, E. M. Sherr, A. G. Mac Diarmid, M. A. Akhtar, Z. Kiss and A. J. Epstein, Mol. Cryst Liq. Cryst 160, 151 (1988); A. Andreatta, Y. Cao, J. C. Chiang, A. J. Heeger, P. Smith, Synth. Met. 26, 383 (1988)]. Emeraldine salt is even more intractable. Covalent substitution such as N-alkylation improves melt processability and solubility in various solvents (W. Y. Zheng, K. Levon, J. Laakso, J. E. Osterholm Macromolecules, 27, 7754 (1994). Recently, it was reported that by using functionalised dopants the melt and solution processability of polyaniline can be increased (Y. Cao, P. Smith and A. J. Heeger, Synth. Met., 48, 91 (1992), Y. Cao, P. Smith and A. J. Heeger, PCT Patent Application WO 22/22911, 1992, Y. Cao, P. Smith, Polymer, 34, 3139 (1993), T. Karna, J. Laakso, E. Savolainen, K. Levon European Patent Application EP 0 545 729 A1, (1993) K. Levon, K. H. Ho, W. Y. Zheng, J. Laakso, T. Karna, T. Taka, J. E. Osterholm, Polymer, 36,2733(1995)., C. Y. Yang, Y. Cao, P. Smith and A. J. Heeger synth. Met. 53,293(1993). A. Pron, J. Laakso, J. E. Osterholm and P. Smith Polymer34, 4235(1993), J. Laakso, A. Pron and S. Lefrant J. Polym. Sci. Part A: Polym. Chem. 33, 1437(1995).

Specific functionalised dopants render high solubility for polyaniline into common solvents and can be solution processed from these solvents by solution casting method. Here, the counterions of the dopant simultaneously act as surfactants for bulk polymers or organic solvents. Well known examples of such counterions are p-dodecylbenzenesulfonic acid and camphor sulphonic acid. The solubilizing group can be introduced to the polymer as an inherent part of the dopant while its acidic center protonates it. According to Heeger et al., the m-cresol solution of polyaniline-camphor sulphonic acid allow preparation of films having d.c conductivities up to 400 S/cm. However, m-cresol is suspected to be a cancer causing substance, thus rendering this route instantly undesirable for obtaining soluble, doped PANI (polyaniline) on a large scale.

The main disadvantage of conductive polyaniline is its limited thermal processability. However, from the industrial point of view, the fabrication of a thermally processable conducting polymer would be preferable because it should exhibit appropriate rheological parameters in the temperature range typically used for classical polymer processing (140–220° C.) and it should be thermally processable. No meaningful conductivity decrease should be observed at the processing temperature. Also, the doping should be carried out in situ during processing. Polymers are usually thermally processed in their molten state or plasticized state. The fabrication of a conducting polymer, which would melt in its doped state, is of course, extremely difficult. Many of alkyl or aryl diesters of phosphoric acid induce simultaneous plastification leading to thermal processability of polyaniline.

OBJECTS OF THE INVENTION

The main object of the present invention is, therefore, to provide a process of preparation of melt/solution processable polyaniline by using sulphonic acid dopants synthesized from 3-pentadecyl phenol, which is hydrogenated cardanol.

Another object of the invention is to provide a process for the synthesis of protonated polyaniline by using these dopants and to obtain highly conducting freestanding flexible films and coatings of polyaniline with thermoplastic polymers.

SUMMARY OF THE INVENTION

The sulphonic acid derivatives of 3-pentadecyl phenol which is otherwise known as hydrogenated cardanol, having a long aliphatic hydrocarbon side chain ($C_{15}H_{31}$) in the meta position of the aromatic ring, have not been reported to be used as protonating-plasticizing dopants. The introduction of the dopant having the hydrophobic group not only enhances the conductivity of polyaniline but also causes its solubilization and plastification. The doped polymer can, therefore, be thermally or solution processed. There is no report that a sulphonic acid system renders the polyaniline thermally processable. Free standing flexible films could be prepared by the hot pressing method and it exhibits a maximum conductivity value of 40 S/cm. Cardanol is a distillation product of an inexpensive natural material known as cashew nut shell liquid. Cardanol with its long flexible aliphatic side chain has special structural features for chemical modification into functionalised dopants to obtain plasticized polyaniline.

The main finding underlying the present invention is that the dopants synthesized by sulphonation of 3-pentadecyl phenol, methyl ether of three pentadecyl phenol and phenoxy acetic acid of pentadecyl phenol, have been found to plasticize and protonate the polyaniline. By hot pressing method, free standing flexible films of doped polyaniline could be prepared and these films are thermally stable at processing temperatures up to 200° C. The other main finding underlying the present invention is that these dopants have hydrophobic groups, which enable them to act as an emulsifying cum protonating agent. Thus, in situ emulsion polymerisation of polyaniline could be carried out to obtain high molecular weight polyaniline. Another finding underlying the present invention is that flexible conductive plastic films can be prepared by the hot pressing of polyblend of protonated polyaniline and classical thermoplastics such as poly(vinyl chloride), poly(methyl methacrylate), poly(vinyl alcohol) etc. and classical elastomers such as natural rubber, ethylene vinyl acetate copolymer etc.

The present invention provides a process for the synthesis of conductive composites of protonated polyaniline with classical thermoplastic polymer such as polyvinyl chloride and classical elastomeric polymer such as ethylene vinyl acetate copolymer with a very low percolation threshold, especially with polyvinyl chloride.

The percolation threshold in polyaniline based conducting composites is of crucial importance for at least two reasons: (a) due to the rather high extinction coefficients of polyaniline for the blue and red light, highly transparent, green films can be fabricated only at extremely low contents of this polymer in the composite and (b) mechanical properties characteristic of the host insulating polymer can be retained only for a small content of the conductive polymer in the composite. These requirements are fulfilled in the polyblend of protonated polyaniline and polyvinyl chloride because the conductive phase exhibits a special morphology of the self-assembled, interpenetrating polymer network type and hence flexible conductive plastic films can be prepared by the hot pressing of polyblend of protonated polyaniline and polyvinyl chloride.

The process of the present invention has essentially the following steps: 1) preparation of the dopants by synthesis involving sulphonation of 3-pentadecyl phenol, methyl ether of 3-pentadecyl phenol and phenoxy acetic acid of pentadecyl phenol, 2) doping by mechanical mixing or by in situ doping emulsion polymerisation of aniline in the presence of the dopants, 3) preparation of the doped polyaniline films by solution and/or melt processing methods and 4) blending of protonated polyaniline with thermoplastics such as poly (vinyl chloride), poly(methylmethacrylate), poly(vinyl alcohol), poly(vinyl acetate) and elastomers such as ethylene vinyl acetate copolymer, natural rubber etc.

DETAILED DESCRIPTION

The present invention provides a melt or solution processable polyaniline, which comprises of polyaniline doped with one or more dopants selected from the compounds of the formulae:

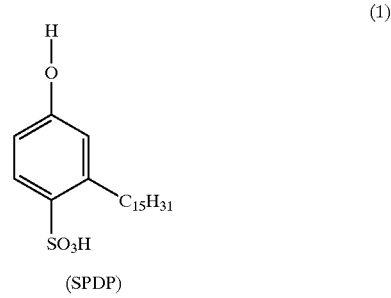

(SPDP)

-continued

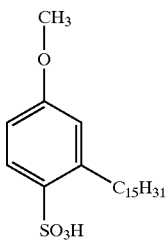

(SPDA)

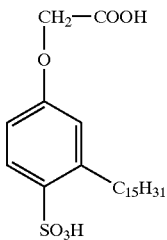

(SPDPAA)

said melt or solution processable polyaniline having the following characteristics:

(a) conductivity ranging between 3 to 60 S/cm.
(b) high solubility in weak polar or non polar solvents selected from chloroform; tetrahydrofuran, xylene, m-cresol
(c) thermal stability up to 200° C.
(d) three dimensional variable range doping condition in the range of 150 to 50 K high degree of crystalline order.

The present invention also provides process for the preparation of melt/solution processable polyaniline by protonating with one or more dopants selected from the compounds of formulae (1), formula (2) and formula (3)

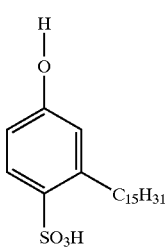

(SPDP)

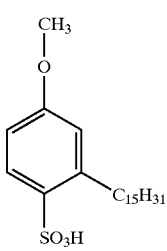

(SPDA)

-continued

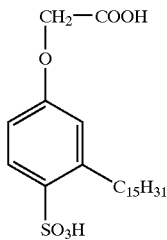

(SPDPAA)

which comprises synthesising said dopants by sulphonation of 3-pentadecyl phenol, methyl ether of 3-pentadecyl phenol and phenoxy acetic acid of 3-pentadecyl phenol, protonating aniline by mechanical mixing or by in situ doping emulsion polymerisation of aniline with one or more of said dopants to obtain protonated polyaniline, subjecting the product so obtained to conventional solution and/or melt processing methods to obtain said melt/solution processable polyaniline.

If desired, said melt/solution processable polyaniline may be with thermoplastics or elastomers to obtain the conductive blends of protonated polyaniline.

Thus, the present invention also provides a process for the preparation conductive blends of protonated polyaniline by protonating with one or more dopants selected from the compounds of the formulae (1), formula (2) and formula (3)

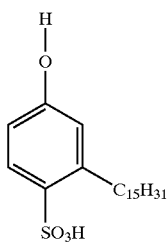

(SPDP)

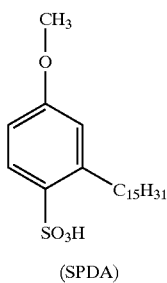

(SPDA)

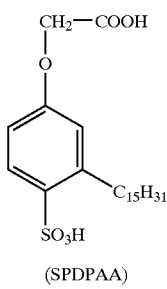

(SPDPAA)

which comprises synthesising said dopants by sulphonation of 3-pentadecyl phenol, methyl ether of 3-pentadecyl phenol and phenoxy acetic acid of 3-pentadecyl phenol, protonating aniline by mechanical mixing or by in, situ doping emulsion polymerisation of aniline with one or more of said dopants to obtain protonated polyaniline, subjecting the product so obtained to conventional solution and/or melt processing methods to obtain said melt/solution processable polyaniline and blending said melt/solution processable polyaniline with thermoplastics or elastomers to obtain said conductive blends of protonated polyaniline.

The thermoplastic may be selected from poly(vinyl chloride), poly(methylmethacrylate), poly(vinyl alcohol) and poly(vinyl acetate) and said elastomers is selected from such ethylene vinyl acetate copolymer and natural rubber.

In a preferred embodiment, the protonation was carried out either by mechanical mixing or by in situ doping emulsion polymerisation route.

In another preferred embodiment said plasticization of polyaniline is carried out simultaneously during the process of protonation.

In yet another preferred embodiment said doped polyaniline films are prepared but solution casting in the presence of solvents selected from $CHCl_3$, THF and xylene.

In another preferred embodiment said doped polyaniline films have an electrical conductivity in the range 3–60 S/cm and are prepared by hot pressing in a hot press by using the conventional melt processing technique.

In a yet another embodiment of the present invention the dopant sulphonic acid of 3-pentadecyl phenol, sulphonic acid of 3-pentadecyl anisole and sulphonic acid of 3-pentadecylphenoxy acetic acid are synthesized from 3-pentadecyl phenol, which is obtained by hydrogenation of cardanol, (distilled product of cashew nut shell liquid, an inexpensive naturally existing biomonomer).

In a further embodiment of the present invention sulphonation of 3-pentadecyl phenol and the derivatives of 3-pentadecyl phenol was carried out at 100–120° C. by using 98% of conc. sulphuric acid. The method of sulphonation of 3-pentadecyl phenol has been reported by S. C. Sethi., B. C. Subba Rao, S. B. Kulkarni, S. S. Katti, Ind. J. Tech., 1, 348, (1963) and M. T. Harvey, U.S. Pat. No. 2,324,300 (to Harvel corp.) 1943, Chem. Abstr., 38 (1944) 188; U.S. Pat. No. 2,137,607 (to Harvel corp.) 1943, Chem. Abstr. 37,5806, (1943); U.S. Pat. No. 2,377,552 (to Harvel corp.) 1945, Chem. Abstr., 39, 4245 (1945) earlier. However, there is no report on its use as a functionalised dopant for polyaniline.

In still another embodiment of the present invention polymerisation of aniline was carried out in aqueous medium at 0° C. by using ammonium persulphate as the oxidant.

In yet another embodiment of the present invention, the in situ emulsion polymerisation of PANI was carried out at 0° C. by using the solvent s xylene or chloroform.

In yet another embodiment free standing flexible films could be prepared both by melt/solution processing by using solvents chloroform, xylene, m-cresol etc.

In yet another embodiment of the present invention, conductive composites of protonated polyaniline with polyvinyl chloride and ethylene vinyl acetate copolymer was prepared.

In yet another embodiment of the present invention, polyblend of polyaniline with ethylene vinyl acetate copolymer was prepared both by solution casting and by the in situ doping emulsion polymerisation in the presence of ethylene vinyl acetate copolymer. On doping the polyaniline with these dopants, it is observed that plastification also takes place simultaneously. Thus, these dopants act as plasticizing cum protonating agents. The plastification threshold of polyaniline occurs at dopant/polyaniline ratio of 0.2 to 0.4 and freestanding flexible films could be prepared-in the above ratio of dopant/polyaniline.

The conducting composites with plastics such polyvinyl chloride and elastomers such as ethylene vinyl acetate copolymer were prepared with a low percolation threshold. The polyblend of polyaniline doped with sulphonic acid of 3-pentadecyl anisole and polyvinyl chloride showed a conductivity of ca. $10^{-3}$ S/cm for a 2% wt/wt of polyaniline, that is three orders of magnitude higher than that usually required for antistatic materials.

The invention is described in detail in the following examples, which are provided by way of illustration only and should not be construed to limit the scope of the invention.

EXAMPLE 1

100 g of cardanol in solvents (100 cm3) such as ethyl acetate, methanol and the like was hydrogenated in a parr hydrogenator at 30–60 psi pressure by using catalysts (50 mg) such as palladised carbon, platinum oxide, raney nickel and the like. at 30–100° C. The hydrogenation was carried out for 2–4 hrs. The solution was filtered to remove the catalyst and methanol stripped off. The crude 3-pentadecyl phenol was distilled under vacuum (4 mm of Hg). The fraction which distilled at 200° C. to 210° C. was collected. The white solid obtained was recrystallised from hexane twice to obtain pure 3-pentadecyl phenol.

EXAMPLE 2

3-pentadecyl phenol (61 g) and potassium hydroxide (26.4 g.) dissolved in water (50 ml.) and alcohol (125 ml.) were taken in a flask and dimethyl sulphate (25.2 g) in alcohol (50 ml.) was added slowly and refluxed for 4 hr. on water bath. The product was extracted with ether. The etheral extract was washed, dried and concentrated. The product 3-pentadecyl anisole was pale yellow colored liquid.

EXAMPLE 3

3-pentadecyl phenol (100.1 g.) and potassium hydroxide (44 g.) dissolved in water (50 ml.) and alcohol (125 ml.) were taken in a flask and monochloroacetic acid (31.5 g) in alcohol was (50 ml.) was added slowly and refluxed for 4 hr. on water bath. The product was acidified and extracted with ether. The etheral extract was washed, dried and concentrated. The residue 3-pentadecyl phenoxy acetic acid was crystallized from light petroleum.

EXAMPLE 4

The 3-pentadecyl phenol (30 g) was taken in a flask, heated to 70–80° C. (oil bath) and conc. $H_2SO_4$ (98 per cent, 0.25 moles) was added slowly while stirring was in progress. After the addition the temperature was raised to 110–120° C. and maintained there till a sample showed complete miscibility with water and thereafter for 30 minutes more. Ice was added to the reaction mass, which was then dissolved in n-butanol, transferred to a separating funnel and the lower aqueous layer containing excess acid was discarded. The butanol solution was washed once with cold water and then neutralised to pH 7 with a 10 per cent aqueous solution of one of the following alkalis: sodium hydroxide, potassium hydroxide, methylamine, mono-, di- or tryethanolamine and ammonium hydroxide. The neutralised product was concentrated and crystallized from absolute alcohol and further acidified to get the sulphonic acid of 3-pentadecyl phenol).

EXAMPLE 5

The 3-pentadecyl anisole (31.6 g) was taken in a flask, heated to 70–80° C. (oil bath) and conc. $H_2SO_4$ (98 per cent, 0.25 moles) was added slowly while stirring was in progress. After the addition the temperature was raised to 110–120° C. and maintained there till a sample showed complete miscibility with water and thereafter for 30 minutes more. Ice was added to the reaction mass, which was then dissolved in n-butanol, transferred to a separating funnel and the lower aqueous layer containing excess acid was discarded. The butanol solution was washed once with cold water and then neutralised to pH 7 with a 10 per cent aqueous solution of one of the following alkalis: sodium hydroxide, potassium hydroxide, methylamine, mono-, di- or tryethanolamine and ammonium hydroxide. The neutralised product was concentrated and crystallized from absolute alcohol and further acidified to get the sulphonic acid of 3-pentadecyl anisole).

EXAMPLE 6

The 3-pentadecyl phenoxy acetic acid (36 g) was taken in a flask, heated to 70–80° C. (oil bath) and conc. $H_2SO_4$ (98 per cent, 0.25 moles) was added slowly while stirring was in progress. After the addition the temperature was raised to 110–120° C. and maintained there till a sample showed complete miscibility with water and thereafter for 30 minutes more. Ice was added to the reaction mass, which was then dissolved in n-butanol, transferred to a separating funnel and the lower aqueous layer containing excess acid was discarded. The butanol solution was washed once with cold water and then neutralised to pH 7 with a 10 per cent aqueous solution of one of the following alkalis: sodium hydroxide, potassium hydroxide, methylamine, mono-, di- or tryethanolamine and ammonium hydroxide. The neutralised product was concentrated and crystallized from absolute alcohol and further acidified to get the sulphonic acid of 3-pentadecyl phenoxy acetic acid).

EXAMPLE 7

Aniline (10 ml.) was dissolved in 600 ml of 1M HCl and the mixture was pre-cooled to below 5° C. in An ice bath. A solution (200 ml) of 11.2 g of ammonium persulphate in 1 m HCl was added to the aniline solution drop-wise over a period of 15 min with vigorous stirring. After ~2 hr. the precipitate was collected on a Buchner funnel and then washed with four portions of 100 ml of 1M HCl. The precipitate was then transferred into a beaker containing 400 ml. of 1 M HCl. The resulting mixture was stirred at room temperature for ~4 h followed by filtration. Upon drying under dynamic vacuum at room temperature for 48 hr., the HCl doped polyaniline was obtained as green powder. It was further converted to the base form by treatment with 3 wt % of aqueous ammonia solution for 3 hr. It was then washed with distilled water and methanol and finally dried in vacuum for 48 hr. at 60° C. Protonation of the emeraldine base (1 mole) was then carried out by taking PANI and the dopants sulphonic acid of 3-pentadecyl phenol, sulphonic acid of 3-pentadecyl anisole and sulphonic acid of 3-pentadecyl phenoxy acetic acid (0.5 mole) and then mechanically mixed by using an agate mortar and pestle at room temperature.

EXAMPLE 8

In situ doping emulsion polymerisation of aniline (0.93 g) was carried out in the presence of the dopant, sulfonic acid of 3-pentadecyl phenol (5.7 g) in xylene (100 ml.) in a round bottom flask and it is cooled to 0–5° C. Polymerisation was initiated by the addition of ammonium peroxy disulphate, (2.28 g) in distilled water, which was added over a period of 30 min. in order to avoid heating of the reaction mixture. The emulsion was then, kept under stirring for 24 hr. and the polymerisation was terminated by pouring the resulting highly viscous emulsion into 300 ml. of acetone, causing protonated complex to precipitate. The dark green powder was then recovered, filtered and washed with acetone till all unreacted dopant is completely removed. Finally, the powder was dried in a vacuum oven for 48 hr. at 55° C.

EXAMPLE 9

In situ doping emulsion polymerisation of aniline (0.93 g) was carried out in the presence of the dopant, sulfonic acid of 3-pentadecyl anisole (6 g) in xylene (100 ml.) in a round bottom flask and it is cooled to 0–5° C. Polymerisation was initiated by the addition of ammonium peroxy disulphate, (2.28 g) in distilled water, which was added over a period of 30 min. in order to avoid heating of the reaction mixture. The emulsion was then, kept under stirring for 24 hr. and the polymerisation was terminated by pouring the resulting highly viscous emulsion into 300 ml. of acetone, causing protonated complex to precipitate. The dark green powder was then recovered, filtered and washed with acetone till unreacted dopant is completely removed. Finally, the powder was dried in a vacuum oven for 48 hr. at 55° C.

EXAMPLE 10

In situ doping emulsion polymerisation of aniline (0.93 g) was carried out in the presence of the dopant, sulfonic acid of 3-pentadecyl phenoxy acetic acid (7 g) in xylene (100 ml.) in a round bottom flask and it is cooled to 0–5° C. Polymerisation was initiated by the addition of ammonium peroxy disulphate, (2.28) in distilled water, which was added over a period of 30 min. in order to avoid heating of the reaction mixture. The emulsion was then, kept under stirring for 24 hr. and the polymerisation was terminated by pouring the resulting highly viscous emulsion into 300 ml. of acetone, causing protonated complex to precipitate. The dark green powder was then recovered, filtered and washed with acetone till unreacted dopant is completely removed. Finally, the powder was dried in a vacuum oven for 48 hr. at 55° C.

EXAMPLE 11

The protonated polyaniline is blended with classical thermoplastic polymer such as polyvinyl chloride at different wt/wt compositions such as 3%, 5%, 10%, 15%, 20%, 25% and 30% wt/wt of polyaniline by the mixing using an agate mortar and pestle at room temperature to obtain a homogeneous mixture. It is then hot pressed at 160° C. by the conventional melt processing technique.

EXAMPLE 12

Protonated polyaniline (2 g) was placed into (98 g) of xylene, treated in an ultrasonic bath for 48 hours, and subsequently centrifuged. Minor insoluble solids were removed by decanting. The protonated polyaniline-ethylene vinylene acetate copolymer polyblend solutions were prepared by mixing the protonated polyaniline into a 10% (wt/wt) ethylene vinylene acetate copolymer in xylene to obtain solutions contain polyaniline in the following compositions: 3%, 5%, 10%, 15%, 20%, 25% and 30%. By the solution casting method of the above-prepared solution freestanding flexible films could be prepared.

EXAMPLE 13

Polyblend of protonated polyaniline with ethylene vinylene acetate copolymer was carried out by the in situ doping emulsion polymerisation of aniline in the presence of the dopant and ethylene vinylene acetate copolymer. 93 g of ethylene vinylene acetate copolymer was dissolved in 600 ml of xylene with stirring followed by adding 18.1 ml aniline drop-wise. Then a 200 ml xylene solution of 130 g sulphonic acid of 3-pentadecylphenoxy acetic acid was added slowly. After mixing with 100 ml distilled water with vigorous stirring to form an emulsion, 100 ml aqueous solution of ammonium persulphate was added drop-wise into the emulsion with stirring at room temperature. The polymerisation lasted for 12 hours. After polymerisation the emulsion was precipitated by pouring into acetone. The dark green sediment was filtered and washed with acetone and water, then vacuum dried for 48 hours. The composite were pressed at 125° C. for 5 minute. The polymerisation was repeated by taking different feeding ratios of aniline/ ethylene vinyl acetate copolymer (wt/wt) such as 0.1, 0.2, 0.5, 1, 1.5 and 1.2.

The Advantages of the Present Invention are the Following:

The present invention provides a process for the preparation of melt/solution processable electrically conducting polyaniline by using the dopants synthesized from an inexpensive naturally existing biomonomer Cashew Nut Shell Liquid. The dopants have long aliphatic hydrocarbon side chain, which makes the polyaniline processable. On protonation of PANI above the dopant/PANI mer ratio of 0.3, plastification of the PANI also takes place, which is thermally processed to free standing flexible films by hot pressing method at different temperatures. The film obtained is stable up to 200° C. The maximum value of conductivity 60 S/cm. was obtained for the thermally processed polyaniline film protonated with sulphonic acid of 3-pentadecyl phenoxy acetic acid.

The protonated polyaniline is highly soluble in chloroform, tetrahydrofuran, xylene and m-cresol. Freestanding films of polyaniline could be prepared from these solvents by solution. The conductivity value obtained for the thermally processable films of polyaniline vary from 3–60 S/cm for different dopants. The films could be thermally stable up to 200° C. without a considerable loss for the conductivity. Also the doped polymer is highly soluble in weakly polar or non-polar organic solvents such as $CHCl_3$, THF, xylene etc. and freestanding flexible films could be prepared by the solution casting from these solvents.

The protonated polyaniline obtained by the present invention exhibits three dimensional variable range hopping conduction in the temperature range 150–50 K. The emulsion polymerised protonated polyaniline complex exhibits high degree of crystalline order. As the present invention described by the present process of preparation of melt/ solution processable polyaniline does not use a commercially available dopant which is expensive and the cost of melt/solution processable polyaniline obtained by the present process is rather low when compared to the solution processable dopants CSA and dodecyl benzenesulphonic acid (DBSA). Not only that CSA and DBSA does not plasticize the polyaniline. Moreover, plastification of by using these dopants synthesized by this invention strongly facilitates the blends of protonated PANI with polyvinyl chloride by thermal processing and with EVA both by solution processing and by in situ doping emulsion polymerisation methods.

We claim:

1. A melt or solution processable polyaniline which comprises polyaniline doped or protonated with a dopant of the formula (1), (2) or (3) shown below

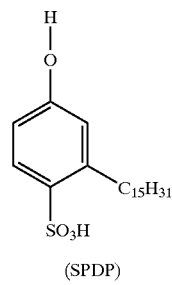

(SPDP)

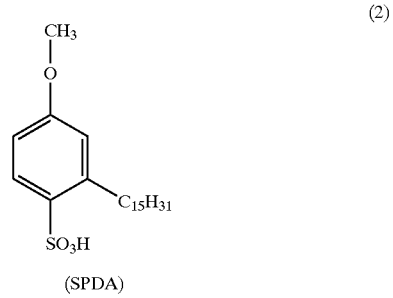

(SPDA)

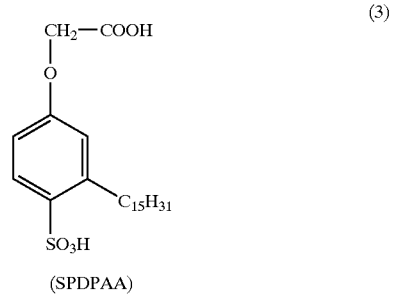

(SPDPAA)

said melt or solution processable polyaniline having:

(a) a conductivity ranging between 3 to 60 S/cm, (b) high solubility in weak polar or non polar solvents selected from chloroform, tetrahydrofuran, xylene, and m-cresol, (c) thermal stability up to 200° C., (d) three dimensional variable range doping condition in the range of 150 to 50 K (−123° C. to 223° C.), and (e) a high degree of crystalline order.

2. A process for the preparation of melt/solution processable polyaniline by protonating with one or more dopants selected from the compounds of formula (1), formula (2) and formula (3)

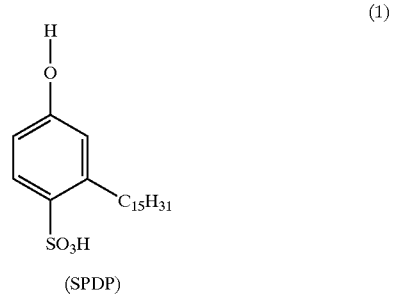

(SPDP)

-continued

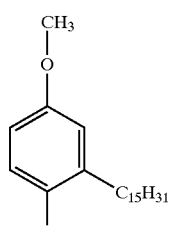

(SPDA) (2)

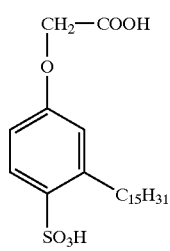

(SPDPAA) (3)

which comprises synthesising said dopants by sulphonation of 3-pentadecyl phenol, methyl ether of 3-pentadecyl phenol and phenoxy acetic acid of 3-pentadecyl phenol, protonating aniline by mechanical mixing or by in situ doping emulsion polymerisation of aniline with said dopants to obtain protonated polyaniline, subjecting the product so obtained to conventional solution and/or melt processing methods to obtain said melt/solution processable polyaniline.

3. A process as claimed in claim 2 wherein said melt or solution processable polymer is blended with thermoplastics or elastomer to obtain the conductive blends of protonated polyaniline.

4. A process as claimed in claim 2 wherein the protonation is carried out by mechanical mixing.

5. A process as claimed in claim 2 wherein said plasticization of polyaniline is carried out simultaneously during the process of protonation.

6. A process as claimed in claim 4 wherein said doped polyaniline films are prepared by solution casting in the presence of one or more solvents selected from the group consisting of CHCl$_3$, THF and xylene.

7. A process as claimed in claim 6 wherein, said doped polyaniline films have an electrical conductivity in the range 3–60 S/cm and prepared by hot pressing in a hot press.

8. A process as claimed in claim 2 wherein said sulphonation is carried out at a temperature in the range of from 100 to 120° C.

9. A process as claimed in claim 3 wherein said thermoplastic is selected from the group consisting of poly(vinyl chloride), poly(methylmethacrylate), poly(vinyl alcohol) and poly(vinyl acetate).

10. A process as claimed in claim 3 wherein the elastomer is selected from ethylene vinyl acetate copolymer and natural rubber.

11. A process for the preparation of conductive blends of protonated polyaniline which comprises synthesising dopants of the formula (1), (2) and (3)

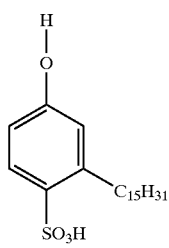

(SPDP) (1)

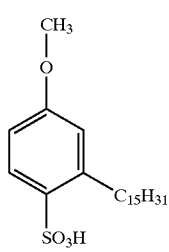

(SPDA) (2)

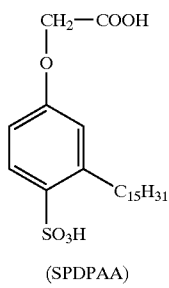

(SPDPAA) (3)

by sulphonation of 3-pentadecyl phenol, methyl ether of 3-pentadecyl phenol and phenoxy acetic acid of 3-pentadecyl phenol, protonating aniline by mechanical mixing or by in situ doping emulsion polymerisation of aniline with said dopants to obtain protonated polyaniline, subjecting the product so obtained to conventional solution and/or melt processing methods to obtain said melt/solution processable polyaniline and blending said melt/solution processable polyaniline with thermoplastics or elastomer to obtain the conductive blends of protonated polyaniline.

12. A process as claimed in claim 11 wherein the protonation is carried out by mechanical mixing.

13. A process as claimed in claim 11 wherein said plasticization of polyaniline is carried out simultaneously during the process of protonation.

14. A process as claimed in claim 13 wherein said doped polyaniline films are prepared by solution casting in the presence of one or more solvents selected from the group consisting of CHCl$_3$, THF and xylene.

15. A process as claimed in claim 14 wherein, said doped polyaniline films have an electrical conductivity in the range 3–60 S/cm and are prepared by hot pressing in a hot press.

16. A process as claimed in claim 11 wherein said sulphonation is carried out at a temperature in the range of from 100 to 120° C.

17. A process as claimed in claim 11 wherein said thermoplastic is selected from the group consisting of poly(vinyl chloride), poly(methylmethacrylate), poly(vinyl alcohol) and poly(vinyl acetate).

18. A process as claimed in claim 11 wherein the elastomer is selected from the group consisting of ethylene vinyl acetate copolymer and natural rubber.

19. A process as claimed in claim 2 wherein the protonation is carried out by in situ doping emulsion polymerization.

20. A process as claimed in claim 19 wherein said doped polyaniline films are prepared by solution casting in the presence of one or more solvents selected from the group consisting of $CHCl_3$, THF and xylene.

21. A process as claimed in claim 20 wherein said doped polyaniline films have an electrical conductivity in the range 3–60 S/cm and are prepared by hot pressing in a hot press.

22. A process as claimed in claim 11 wherein the protonation is carried out by in situ doping emulsion polymerization.

* * * * *